US012667990B2

(12) United States Patent
Chen

(10) Patent No.: US 12,667,990 B2
(45) Date of Patent: Jun. 30, 2026

(54) PIPE CUTTING DEVICE

(71) Applicant: Shih-Yang Chen, Changhua County (TW)

(72) Inventor: Shih-Yang Chen, Changhua County (TW)

( * ) Notice: Subject to any disclaimer, the term of this patent is extended or adjusted under 35 U.S.C. 154(b) by 104 days.

(21) Appl. No.: 18/888,993

(22) Filed: Sep. 18, 2024

(65) Prior Publication Data

US 2026/0077527 A1 Mar. 19, 2026

(51) Int. Cl.
B26D 3/16 (2006.01)
B23D 21/08 (2006.01)

(52) U.S. Cl.
CPC .............. B26D 3/169 (2013.01); B23D 21/08 (2013.01)

(58) Field of Classification Search
CPC ........ B23D 21/06; B23D 21/08; B23D 21/10; B26D 3/169; B26D 2007/013; B26D 7/2635
USPC ............................... 30/102, 101, 95, 94, 90.9
See application file for complete search history.

(56) References Cited

U.S. PATENT DOCUMENTS

| | | | | |
|---|---|---|---|---|
| 3,715,804 A | * | 2/1973 | Kelley .................... | B23D 21/08 30/99 |
| 4,611,358 A | * | 9/1986 | Mills ........................ | B21D 7/06 72/477 |
| 5,515,609 A | * | 5/1996 | Sperti .................... | B23D 21/10 30/95 |
| 6,393,700 B1 | * | 5/2002 | Babb ...................... | B23D 21/08 30/101 |
| 6,539,634 B2 | | 4/2003 | Merle et al. | |
| 8,413,336 B2 | * | 4/2013 | Chiu ...................... | B23D 21/08 30/92 |
| 10,981,287 B2 | * | 4/2021 | Liao ...................... | B26D 3/169 |
| 11,571,755 B2 | * | 2/2023 | Heinsohn ............... | B23D 21/06 |
| 2012/0240410 A1 | * | 9/2012 | Chiu ...................... | B23D 21/08 30/102 |
| 2016/0008895 A1 | * | 1/2016 | Chen ...................... | B23D 21/08 30/102 |
| 2017/0368705 A1 | * | 12/2017 | Liao ........................ | B26D 3/169 |
| 2021/0060670 A1 | * | 3/2021 | Chen ........................ | B26D 7/04 |
| 2024/0390999 A1 | * | 11/2024 | Liao ...................... | B23D 21/08 |
| 2026/0054406 A1 | * | 2/2026 | Chen ...................... | B26D 3/169 |

FOREIGN PATENT DOCUMENTS

| | | | | | |
|---|---|---|---|---|---|
| JP | | 2563748 Y2 | * | 2/1998 | ............. B23D 21/08 |
| KR | | 101474885 B1 | * | 12/2014 | .............. B26D 1/14 |

* cited by examiner

*Primary Examiner* — Laura M Lee

(74) *Attorney, Agent, or Firm* — LANWAY IPR SERVICES; Chun-Ming Shih

(57) ABSTRACT

A pipe cutting device includes a main body, two roller units, a sliding unit, a threaded rod unit, and a control unit. The main body is provided with a first receiving recess, a second receiving recess, and a first hollow slot. The roller units are pivotally mounted in the second receiving recess. The sliding unit is mounted in the first receiving recess and movable relative the roller units. The threaded rod unit includes a rotation member and a threaded rod. The control unit is assembled with the sliding unit and the threaded rod unit. The control unit may be pressed and is movable in the sliding unit. The control unit protrudes from the first hollow slot. The control unit and the cutting wheel are arranged on two opposite sides of the main body.

8 Claims, 12 Drawing Sheets

A-A

A-A

A-A

PIPE CUTTING DEVICE

BACKGROUND OF THE INVENTION

Field of the Invention

The present invention relates to a cutting device and, more particularly, to a pipe cutting device.

Description of the Related Art

A conventional paring device was disclosed in the U.S. Pat. No. 6,539,634, and comprises a paring head 2 and a snap lock 8. The snap lock 8 has a seesaw structure. After the snap lock 8 is pressed, the screwing portion disengages the threaded rod, so that the paring head 2 is pushed to move rapidly.

A conventional pipe cutting device was disclosed in the U.S. Pat. No. 11,571,755, and comprises an engagement element 21, a work head 3, a counter-support 4, and a positioning element 5. The engagement element 21 has a seesaw structure. After the engagement element 21 is pressed, the screwing portion disengages the threaded rod, so that the positioning element 5 is pushed to move rapidly.

However, the conventional pipe cutting device has the following disadvantages.

1. After the toothed section 26 of the engagement element 21 is unlocked from the receiving part 19, the cutting element 10 and the engagement element 21 slide in the carriage guide 9. The engagement between the toothed section 26 of the engagement element 21 is unlocked from the receiving part 19 is controlled by a seesaw or lever principle of the engagement element 21. Thus, the position of the shaft of the engagement element 21 is very important. The engagement element 21 cannot engage the receiving part 19 exactly if the position of the shaft has an error or allowance.

2. The cutting element 10 and the engagement element 21 are arranged on the same side, so that when the user applies a force to push the engagement element 21, the user's finger may unintentionally slide and touch the cutting element 10, thereby causing danger to the user.

BRIEF SUMMARY OF THE INVENTION

The primary objective of the present invention is to provide a pipe cutting device whose parts or components are assembled exactly and steadily.

In accordance with the present invention, there is provided a pipe cutting device comprising a main body, two roller units, a sliding unit, a threaded rod unit, and a control unit. The main body is provided with a first receiving recess, a first pivot portion, a second receiving recess, two first connecting portions, and a first hollow slot. The two roller units are pivotally mounted in the second receiving recess. The sliding unit is mounted in the first receiving recess and is movable in the first receiving recess. The sliding unit is close to or away from the two roller units. The threaded rod unit is pivotally connected with the main body and the sliding unit. The threaded rod unit includes a rotation member, a threaded rod, and a second connecting member. The rotation member is provided with a first mounting portion. The threaded rod is provided with a third pivot portion, a first screwing portion, and a second mounting portion. The control unit is assembled with the sliding unit and the threaded rod unit. The control unit is movable in the fifth receiving recess. The control unit may be pressed. The control unit partially protrudes from the fifth receiving recess and the first hollow slot. The control unit and the cutting wheel are arranged on two sides of the main body.

According to the primary advantages of the present invention, the sliding unit is moved in the first receiving recess, the threaded rod unit is pivotally connected with the main body and the sliding unit, and the control unit is received in the sliding unit, so that the main body, the sliding unit, the threaded rod unit, and the control unit are assembled exactly.

According to another advantage of the present invention, the control unit is moved linearly so that the second screwing portion engages or disengages the first screwing portion. The position of the fifth receiving recess may have a larger tolerance. After the control unit is received in the fifth receiving recess, the user only needs to rotate the threaded rod unit slightly to engage the second screwing portion with the first screwing portion. Thus, the second screwing portion engages the first screwing portion exactly by a linear displacement of the control unit.

According to a further advantage of the present invention, the control unit is moved linearly so that the second screwing portion engages or disengages the first screwing portion. When the pipe cutting device has a larger specification, the width of the fifth receiving recess is increased, so that the control member may have a larger width, and the second screwing portion has more teeth for engaging the first screwing portion. Thus, the second screwing portion engages the first screwing portion exactly by changing the width of the fifth receiving recess and the width of the control member.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
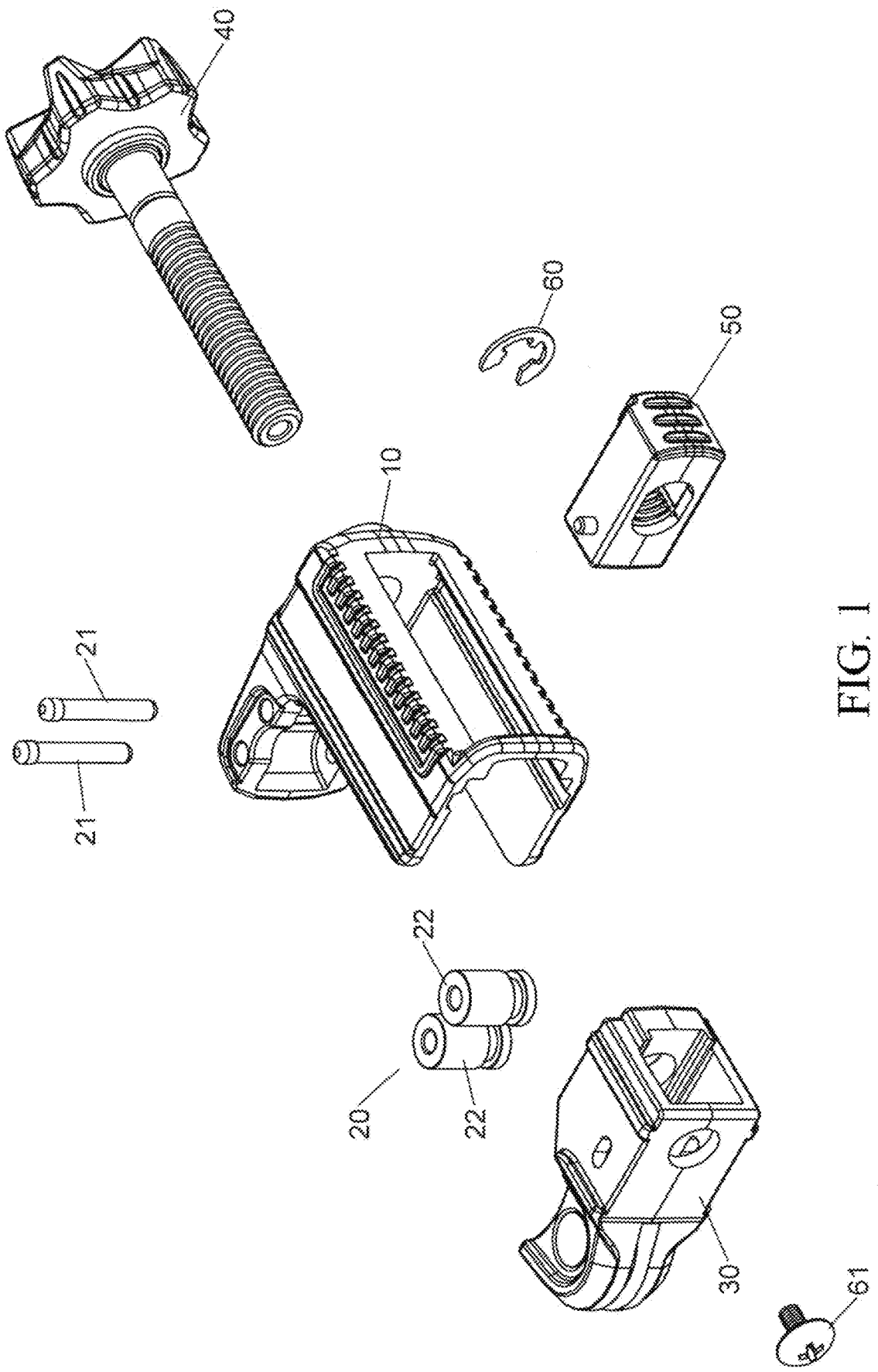
FIG. 1 is an exploded perspective view of a pipe cutting device in accordance with the preferred embodiment of the present invention.
Figure 2:
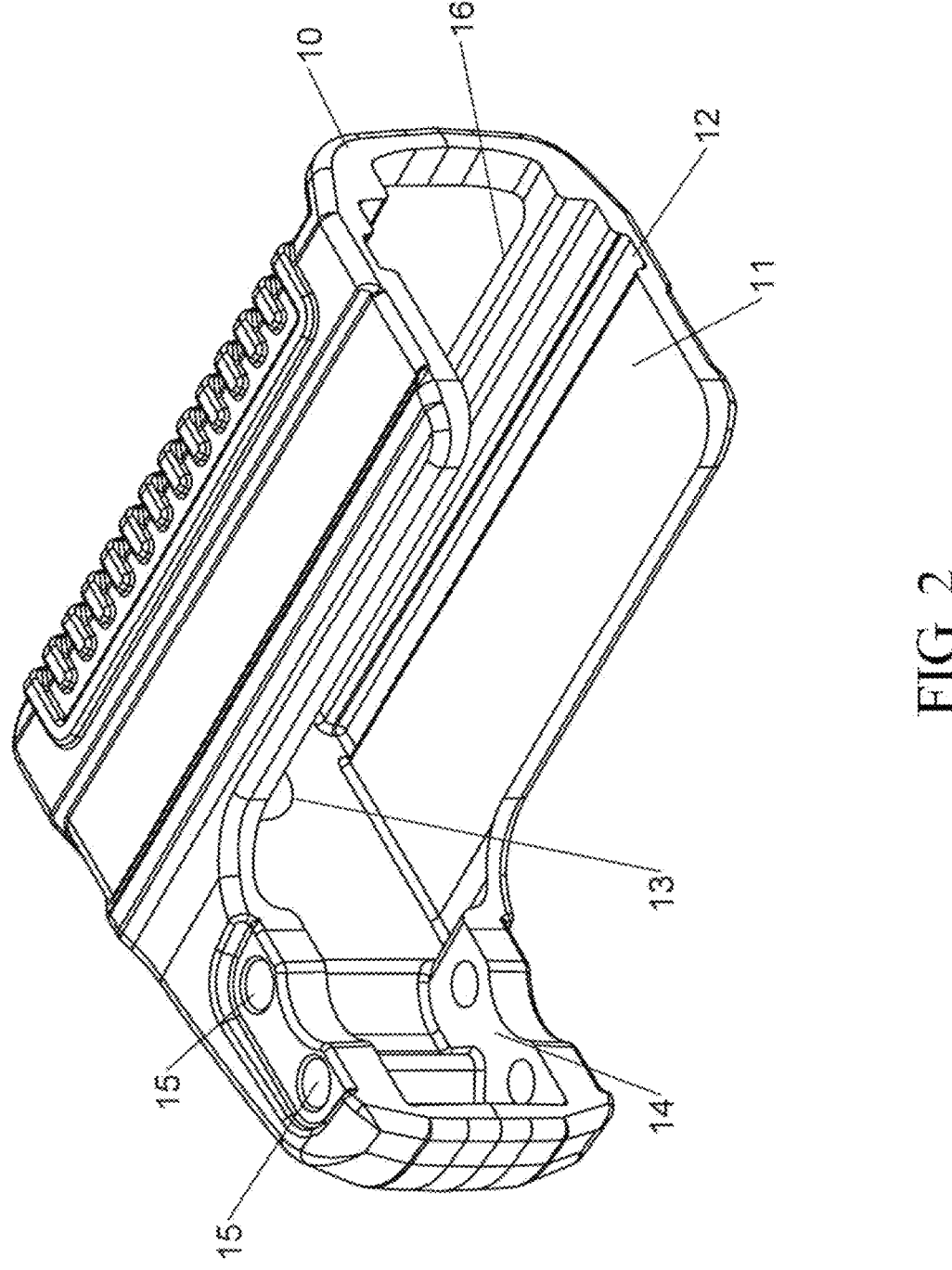
FIG. 2 is a perspective view of a main body of the pipe cutting device in accordance with the preferred embodiment of the present invention.
Figure 3:
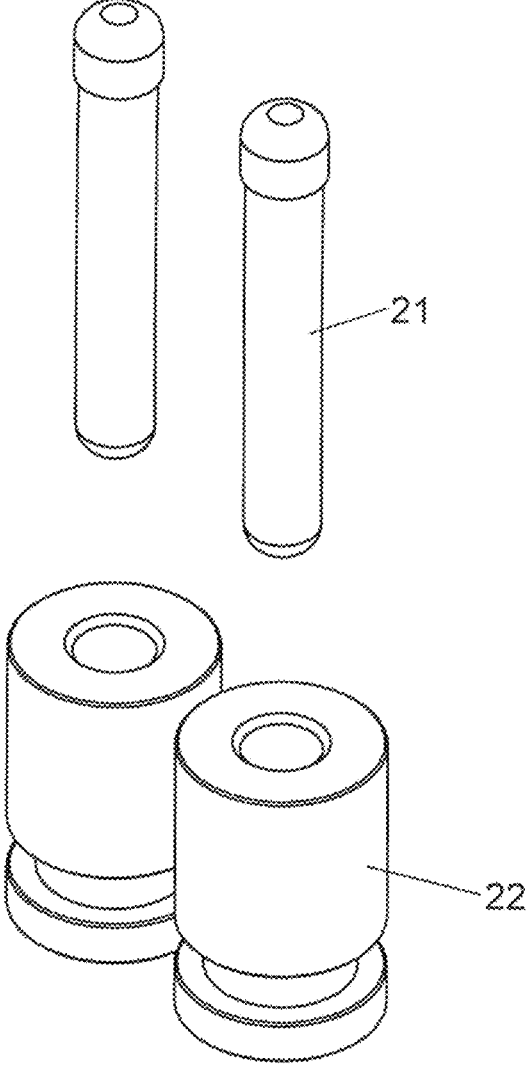
FIG. 3 is an exploded perspective view of a roller unit of the pipe cutting device in accordance with the preferred embodiment of the present invention.
Figure 4:
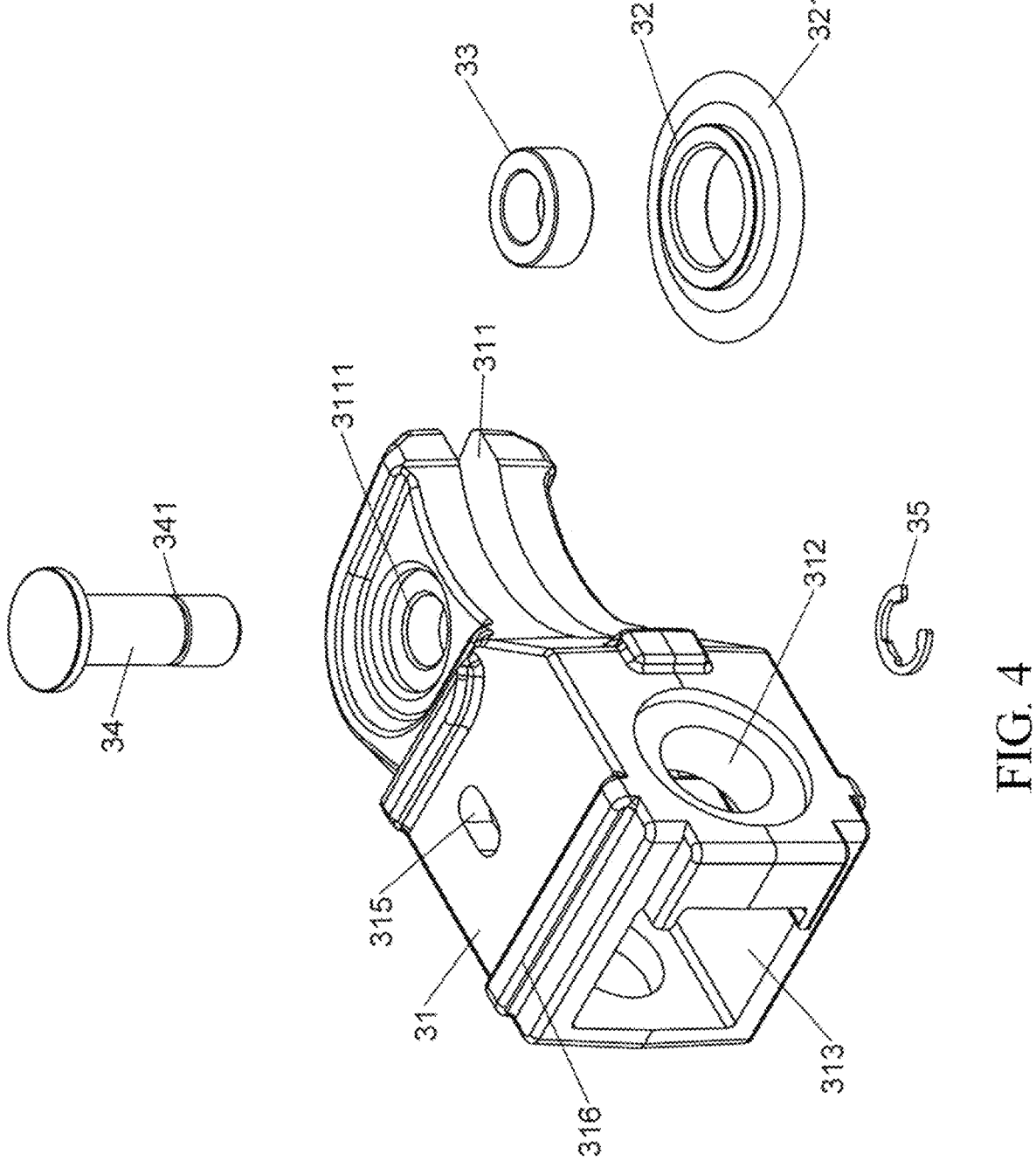
FIG. 4 is an exploded perspective view of a sliding unit of the pipe cutting device in accordance with the preferred embodiment of the present invention.
Figure 5:
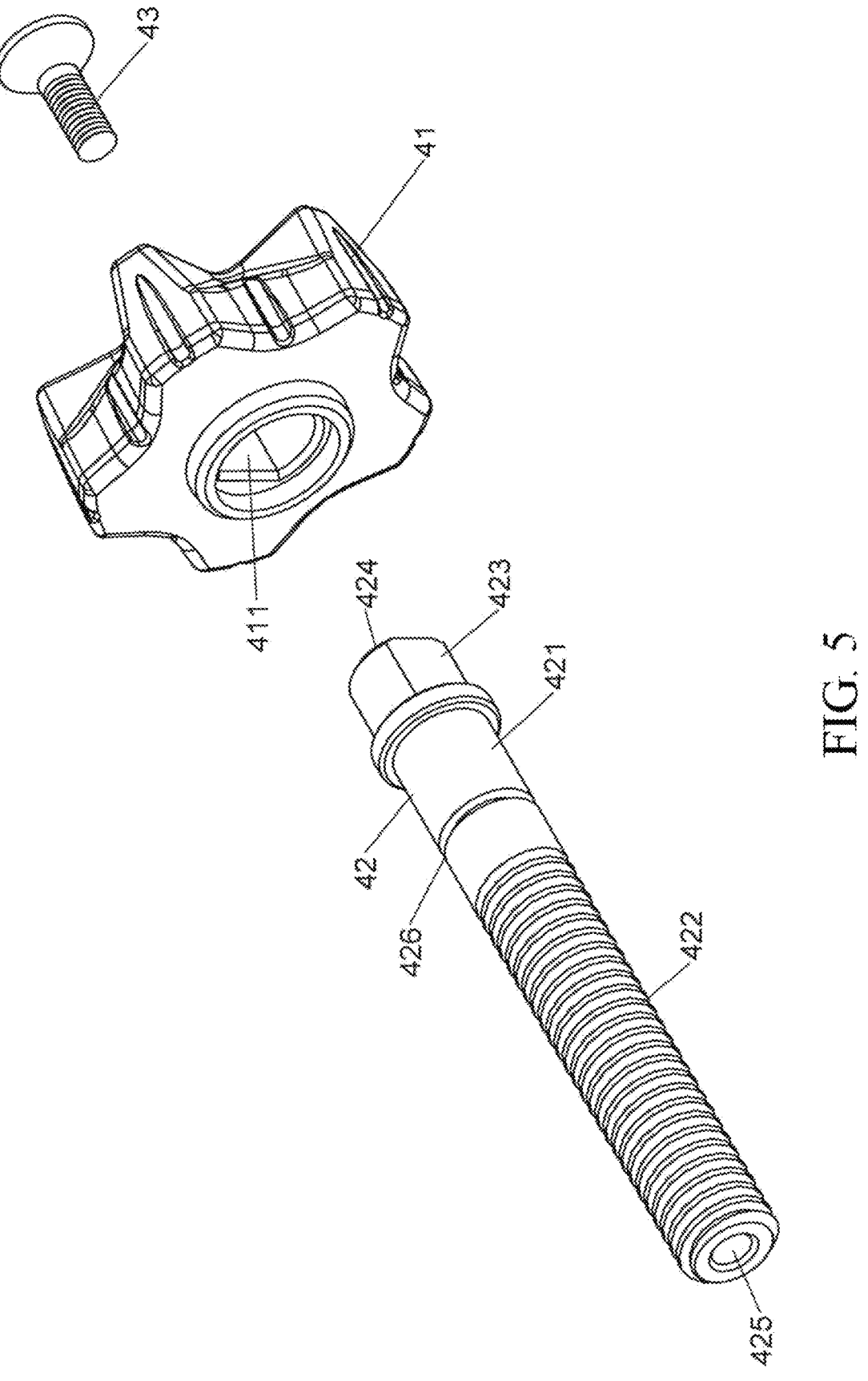
FIG. 5 is an exploded perspective view of a threaded rod unit of the pipe cutting device in accordance with the preferred embodiment of the present invention.
Figures 6, 7:
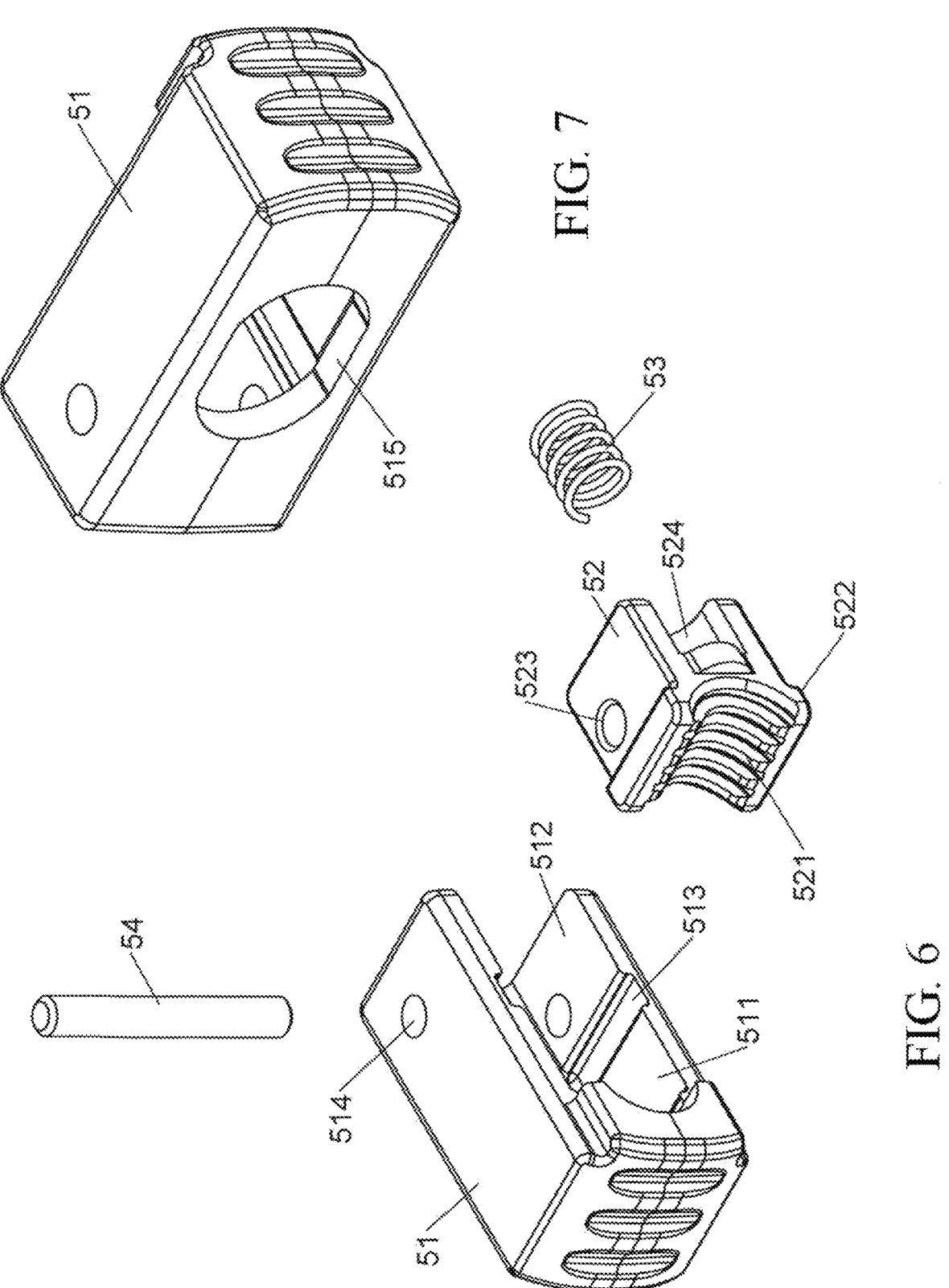
FIG. 6 is an exploded perspective view of a control unit of the pipe cutting device in accordance with the preferred embodiment of the present invention.
FIG. 7 is a perspective view of a press member of the pipe cutting device in accordance with the preferred embodiment of the present invention.
Figure 8:
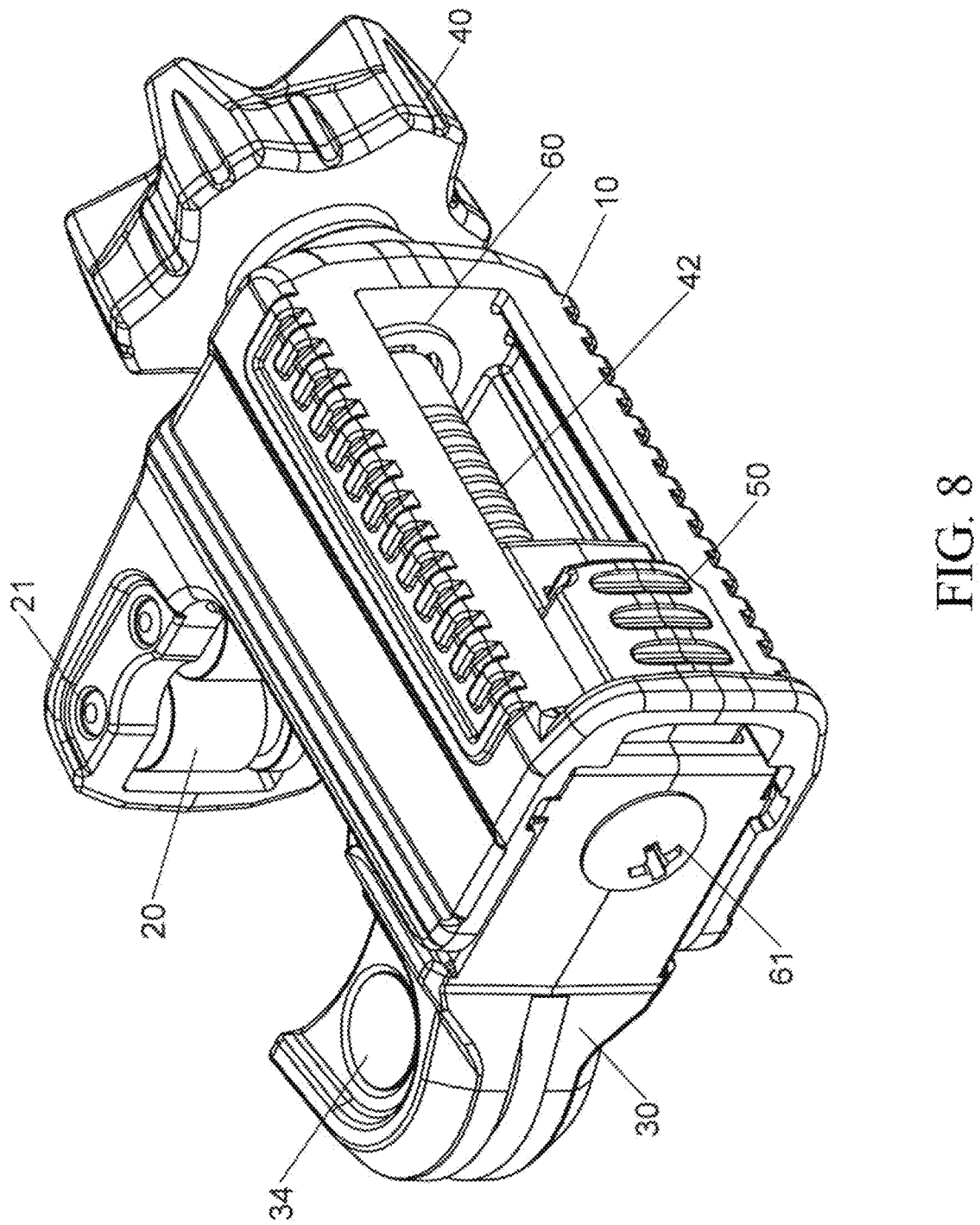
FIG. 8 is a perspective view of the pipe cutting device in accordance with the preferred embodiment of the present invention.

Referring to the drawings and initially to FIGS. 1-10, a pipe cutting device in accordance with the preferred embodiment of the present invention comprises a main body (or housing) 10, two roller units 20, a sliding unit 30, a threaded rod unit 40, and a control unit 50.

The main body 10 is a substantially L-shaped shell. The main body 10 has an integrally formed structure and is made of metal or plastic material. The main body 10 has an interior provided with a first receiving recess 11. The main body 10 is provided with two first slide guides 12 connected to the first receiving recess 11. Each of the two first slide guides 12 is an elongate channel and extends in a longitudinal direction of the first receiving recess 11. The two first slide guides 12 are arranged symmetrically relative to the first receiving recess 11. The main body 10 is provided with a first pivot portion 13 connected to the first receiving recess 11. The first pivot portion 13 is located beside the first receiving recess 11. The main body 10 is provided with a second receiving recess 14. The second receiving recess 14 and the first pivot portion 13 are formed on an end of the main body 10. The second receiving recess 14 and the first receiving recess 11 are connected and form an L-shaped profile. The main body 10 is provided with two first connecting (or fastening or coupling) portions 15 connected to the second receiving recess 14. Each of the two first connecting portions 15 is a perforation. The main body 10 is provided with a first hollow slot 16 connected to the first receiving recess 11. The first hollow slot 16 is located beside the first receiving recess 11. The first hollow slot 16 extends in the longitudinal direction of the first receiving recess 11. The first hollow slot 16 has an elongate shape.

The two roller units 20 are pivotally mounted in the second receiving recess 14. Each of the two roller units 20 includes a shaft 21 and a roller 22. The shaft 21 is pivotally mounted on one of the two first connecting portions 15. The shaft 21 is a circular rod. The roller 22 is pivotally mounted on the shaft 21 and received in the second receiving recess 14.

The sliding unit 30 is mounted in the first receiving recess 11 and is movable in the first receiving recess 11. The sliding unit 30 is close to or away from the two roller units 20. The sliding unit 30 includes a slide 31, a cutting wheel 32, a bearing 33, a post 34, and a first connecting (or fastening or coupling) member 35.

The slide 31 is partially received in the first receiving recess 11 and is movable linearly in the first receiving recess 11. The slide 31 has a first end provided with a third receiving recess 311 directed toward the second receiving recess 14. The third receiving recess 311 is provided with a second pivot portion 3111. The second pivot portion 3111 is a circular perforation and is connected to the third receiving recess 311. The slide 31 is provided with a fourth receiving recess 312 aligning with the first pivot portion 13 and penetrating the slide 31. The slide 31 has a second end provided with a fifth receiving recess 313 connected to the fourth receiving recess 312 and aligning with the first hollow slot 16. The slide 31 is provided with an elongate slot 315 connected to the fifth receiving recess 313. The slide 31 is provided with two second slide guides 316 formed on a top and a bottom thereof. The two second slide guides 316 are slidably mounted on the two first slide guides 12 so that the sliding unit 30 slides on the main body 10 linearly. Each of the two second slide guides 316 is an elongate projection.

The cutting wheel 32 is rotatably mounted in the third receiving recess 311. The cutting wheel 32 is a circular cutter and has a periphery provided with a knife (or blade) portion 321 for cutting a pipe. The cutting wheel 32 aligns with the two roller units 20. The cutting wheel 32 is close to or away from the two roller units 20. The bearing 33 is mounted in an axis of the cutting wheel 32.

The post 34 extends through the second pivot portion 3111 and is pivotally connected with the cutting wheel 32 and the bearing 33, so that the cutting wheel 32 is rotatably mounted in the third receiving recess 311. The post 34 is an elongate rod having a T-shaped cross-sectional profile. The post 34 is provided with a second connecting (or fastening or coupling) portion 341. The second connecting portion 341 is an annular groove.

The first connecting member 35 is a C-shaped snap ring snapped (or snap-fit or locked) onto the second connecting portion 341, so that the post 34 is pivotally mounted on the second pivot portion 3111. When the first connecting member 35 is detached (or unlocked) from the second connecting portion 341, the post 34, the bearing 33, and the cutting wheel 32 are removed from the slide 31.

The threaded rod unit 40 is pivotally connected with the main body 10 and the sliding unit 30. The threaded rod unit 40 includes a rotation member 41, a threaded rod 42, and a second connecting (or fastening or coupling) member 43.

The rotation member 41 is rotatably mounted outside of the main body 10 and may be rotated by a user. The rotation member 41 is provided with a first mounting portion 411. The first mounting portion 411 is a non-circular recess. The rotation member 41 and the two roller units 20 are disposed on the same end of the main body 10. The rotation member 41 is distant from the cutting wheel 32.

The threaded rod 42 is provided with a third pivot portion 421 pivotally mounted on the first pivot portion 13. The threaded rod 42 has a first end provided with a first screwing portion 422 received in the first receiving recess 11. The first screwing portion 422 extends through the fourth receiving recess 312. The first screwing portion 422 is loosely fitted in the fourth receiving recess 312. The threaded rod 42 has a second end provided with a second mounting portion 423 mounted on the first mounting portion 411. The second mounting portion 423 has a shape matching that of the first mounting portion 411. When the rotation member 41 is rotated, the rotation member 41 drives and rotates the threaded rod 42 simultaneously. The second mounting portion 423 has an interior provided with a third connecting (or fastening or coupling) portion 424. The third connecting portion 424 is a screw hole. The threaded rod 42 has an end portion provided with a fourth connecting (or fastening or coupling) portion 425. The fourth connecting portion 425 and the first screwing portion 422 are formed on the first end of the threaded rod 42. The fourth connecting portion 425 is a screw hole. The threaded rod 42 is provided with a fifth connecting (or fastening or coupling) portion 426 located between the third pivot portion 421 and the first screwing portion 422. The fifth connecting portion 426 is an annular groove.

The second connecting member 43 is a threaded rod (or screw). The second connecting member 43 extends into the rotation member 41 and is screwed into the third connecting portion 424, so that the rotation member 41 and the threaded rod 42 are rotated simultaneously.

The control unit 50 is assembled with the sliding unit 30 and the threaded rod unit 40. The control unit 50 is received and movable in the fifth receiving recess 313. The control unit 50 partially protrudes from the fifth receiving recess 313 and the first hollow slot 16 and may be pressed by the user. The control unit 50 and the cutting wheel 32 are arranged on two sides of the main body 10. The control unit 50 drives the sliding unit 30 to move linearly in the first receiving recess 11. When the threaded rod unit 40 is rotated, the control unit 50 and the sliding unit 30 are driven to move linearly.

The sliding unit 30 is moved in the main body 10, and the control unit 50 is moved on the sliding unit 30. The control unit 50 is moved in a direction perpendicular to that of the sliding unit 30.

The control unit 50 includes a press member 51, a control member 52, an elastic member 53, and a third connecting (or fastening or coupling) member 54.

The press member 51 is received in the fifth receiving recess 313 and partially protrudes from the fifth receiving recess 313 and the first hollow slot 16. The press member 51 is provided with a sixth receiving recess 511 allowing passage of the threaded rod 42. The press member 51 has an end provided with a seventh receiving recess 512 which is an open cavity. The press member 51 is provided with two third slide guides 513 located between the sixth receiving recess 511 and the seventh receiving recess 512. The two third slide guides 513 are opposite to each other. Each of the two third slide guides 513 is a groove. The press member 51 is provided with a sixth connecting (or fastening or coupling) portion 514 which is a perforation penetrating the seventh receiving recess 512 from top to bottom. The press member 51 is provided with an eighth receiving recess 515 located beside the sixth receiving recess 511. The press member 51 is a non-circular piece.

The control member 52 is assembled with the press member 51 and received in the seventh receiving recess 512. The control member 52 has a first end provided with a second screwing portion 521 engaging (or meshing with) the first screwing portion 422. The control member 52 is provided with two fourth slide guides 522 formed on a top and a bottom thereof. The two fourth slide guides 522 are received in the two third slide guides 513 respectively. Each of the two fourth slide guides 522 is a protruding rail. The control member 52 is provided with a seventh connecting (or fastening or coupling) portion 523 aligning with the sixth connecting portion 514. The seventh connecting portion 523 is a perforation. The control member 52 has a second end provided with a spring cavity 524 which is disconnected from the second screwing portion 521. The control member 52 is a non-circular block.

The elastic member 53 is received in the spring cavity 524. The elastic member 53 has a first end pressing the spring cavity 524 of the control member 52 and a second end pressing a bottom of the fifth receiving recess 313. The second screwing portion 521 is pressed by an elastic force of the elastic member 53 and engages the first screwing portion 422. The elastic member 53 is a spring.

The third connecting member 54 extends through the sixth connecting portion 514 and the seventh connecting portion 523 and has an end extending into the elongate slot 315. The third connecting member 54 is movable in the elongate slot 315, so that the control unit 50 is movable on the sliding unit 30 through a distance.

In assembly, the threaded rod unit 40 restricts the control member 52 which restricts the press member 51, so that the control unit 50 is assembled on the sliding unit 30 without detachment. The third connecting member 54 is assembled with the press member 51 and the control member 52 and is limited by the elongate slot 315, so that the control unit 50 is assembled on the sliding unit 30 without detachment. Thus, the control unit 50 is limited by the threaded rod unit 40 and the sliding unit 30, so that the control unit 50 has a double restriction function without detachment.

In practice, when the control unit 50 is pushed, the press member 51 and the control member 52 are moved in the fifth receiving recess 313, the elastic member 53 is compressed, and the second screwing portion 521 disengages the first screwing portion 422. Thus, when the control unit 50 is moved, the control unit 50 drives and moves the sliding unit 30, to adjust a distance between the cutting wheel 32 and the two roller units 20. When the control unit 50 is released, the control member 52 is moved by the elastic force of the elastic member 53, and the second screwing portion 521 engages the first screwing portion 422.

The pipe cutting device further comprises a fourth connecting (or fastening or coupling) member 60 assembled with the fifth connecting portion 426. The fourth connecting member 60 is a C-shaped snap ring. The fourth connecting member 60 rests on a wall of the main body 10. The third pivot portion 421 is limited by the fourth connecting member 60, so that the threaded rod 42 is pivotally mounted in the main body 10 and the sliding unit 30. The rotation member 41 is limited by the threaded rod 42, so that the rotation member 41 is rotatably mounted outside of the main body 10, and the threaded rod unit 40 is pivotally mounted on the main body 10 and the sliding unit 30.

The pipe cutting device further comprises a fifth connecting (or fastening or coupling) member 61 assembled with the fourth connecting portion 425. The sliding unit 30 is moved to touch the fifth connecting member 61 which restricts the sliding unit 30 to prevent the sliding unit 30 from being detached from the threaded rod 42 during displacement.

Figures 9, 10:
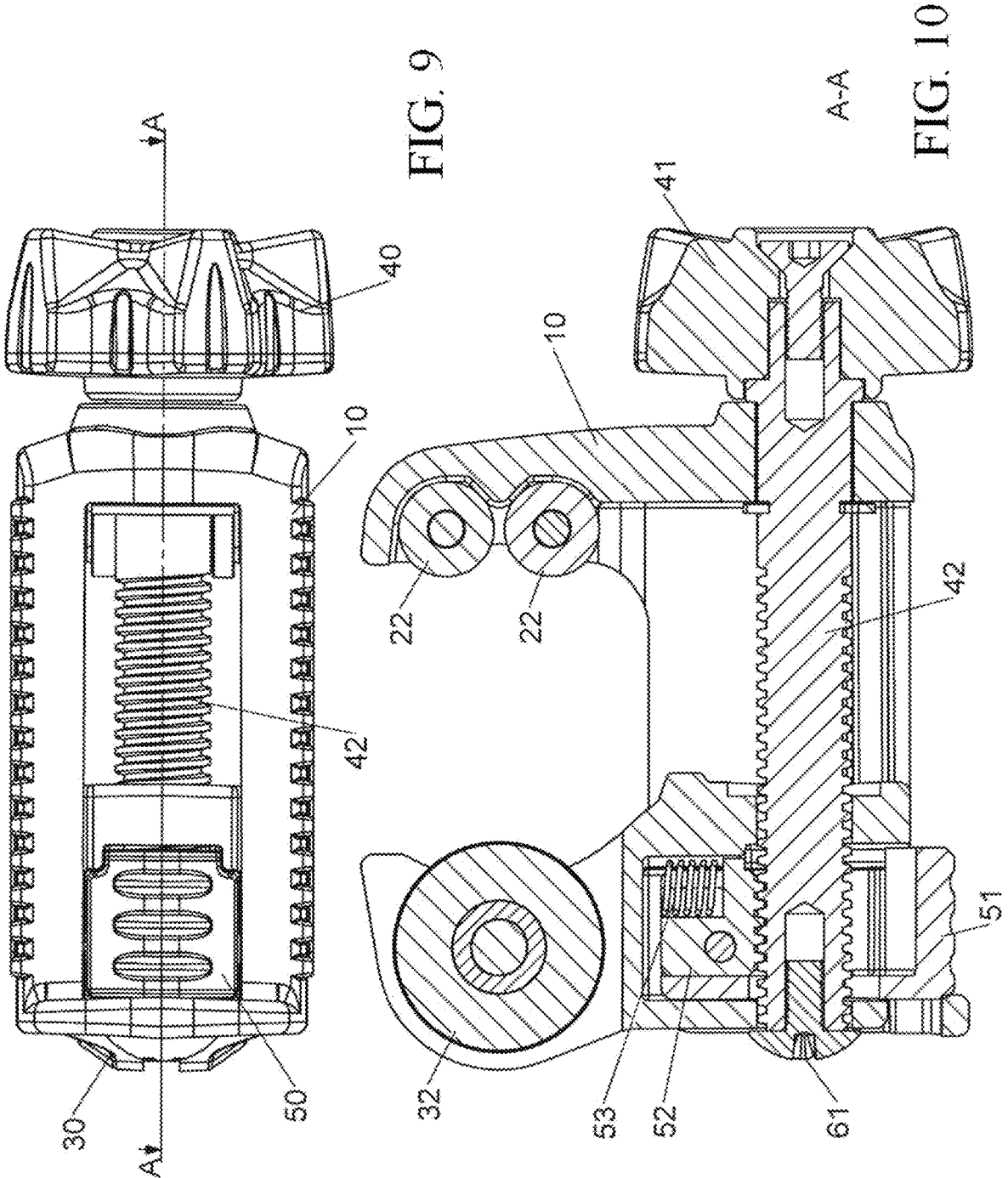
FIG. 9 is a top view of the pipe cutting device in accordance with the preferred embodiment of the present invention.
FIG. 10 is a cross-sectional view of the pipe cutting device taken along line A-A as shown in FIG. 9.

Referring to FIGS. 9 and 10 with reference to FIGS. 1-8, the two roller units 20 are mounted in the second receiving recess 14. The sliding unit 30 is mounted in the first receiving recess 11 and is movable linearly in the first receiving recess 11. The threaded rod 42 is pivotally mounted in the first pivot portion 13 and the fourth receiving recess 312. The control unit 50 is received and movable in the fifth receiving recess 313. The second screwing portion 521 is pressed by the elastic force of the elastic member 53 and engages the first screwing portion 422. When the first screwing portion 422 of the threaded rod unit 40 is rotated, the control unit 50 and the sliding unit 30 are driven to move linearly. The control unit 50 drives the sliding unit 30 to move linearly in the first receiving recess 11, to adjust the distance between the cutting wheel 32 and the two roller units 20 according to the user's requirement. The fourth connecting member 60 is snapped onto the fifth connecting portion 426, so that the threaded rod unit 40 is pivotally connected with the main body 10 and the sliding unit 30. Thus, the third pivot portion 421 is limited by the fourth connecting member 60, so that when the rotation member 41 is rotated, the threaded rod 42 is rotated in place and cannot be displaced.

Figure 11:
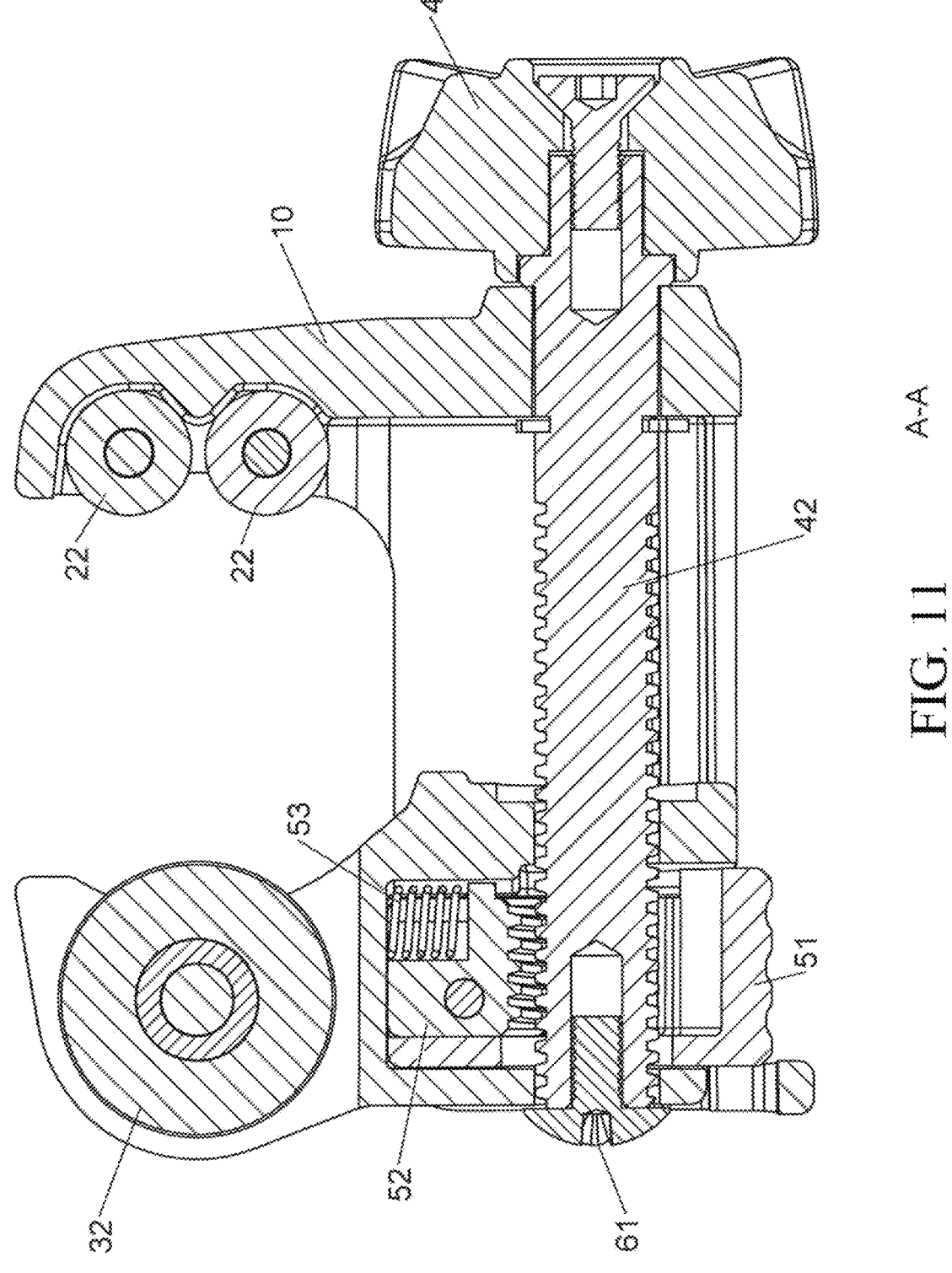
FIG. 11 is a first operational view of the pipe cutting device as shown in FIG. 10.
Figure 12:
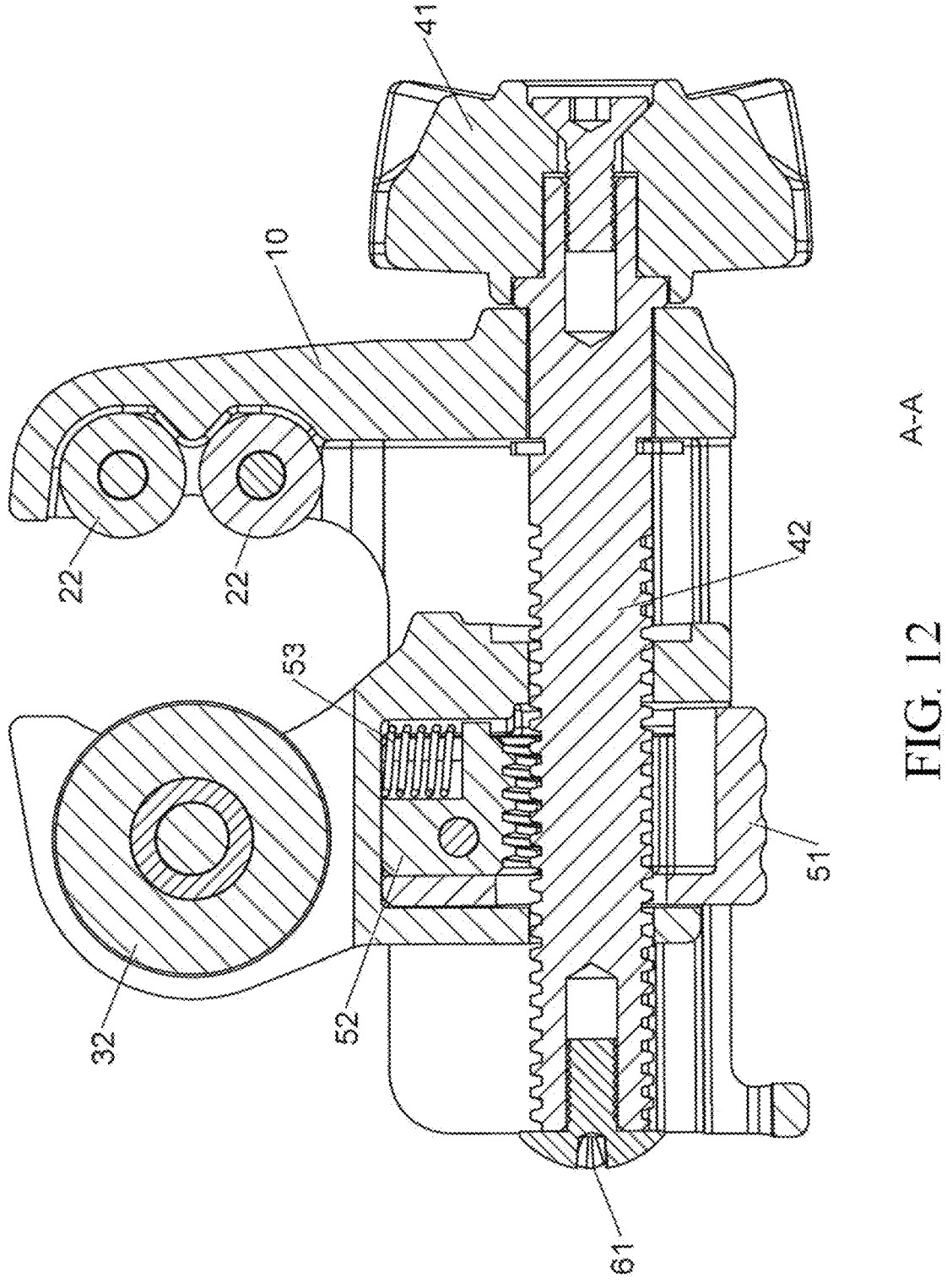
FIG. 12 is a second operational view of the pipe cutting device as shown in FIG. 10.
Figure 13:
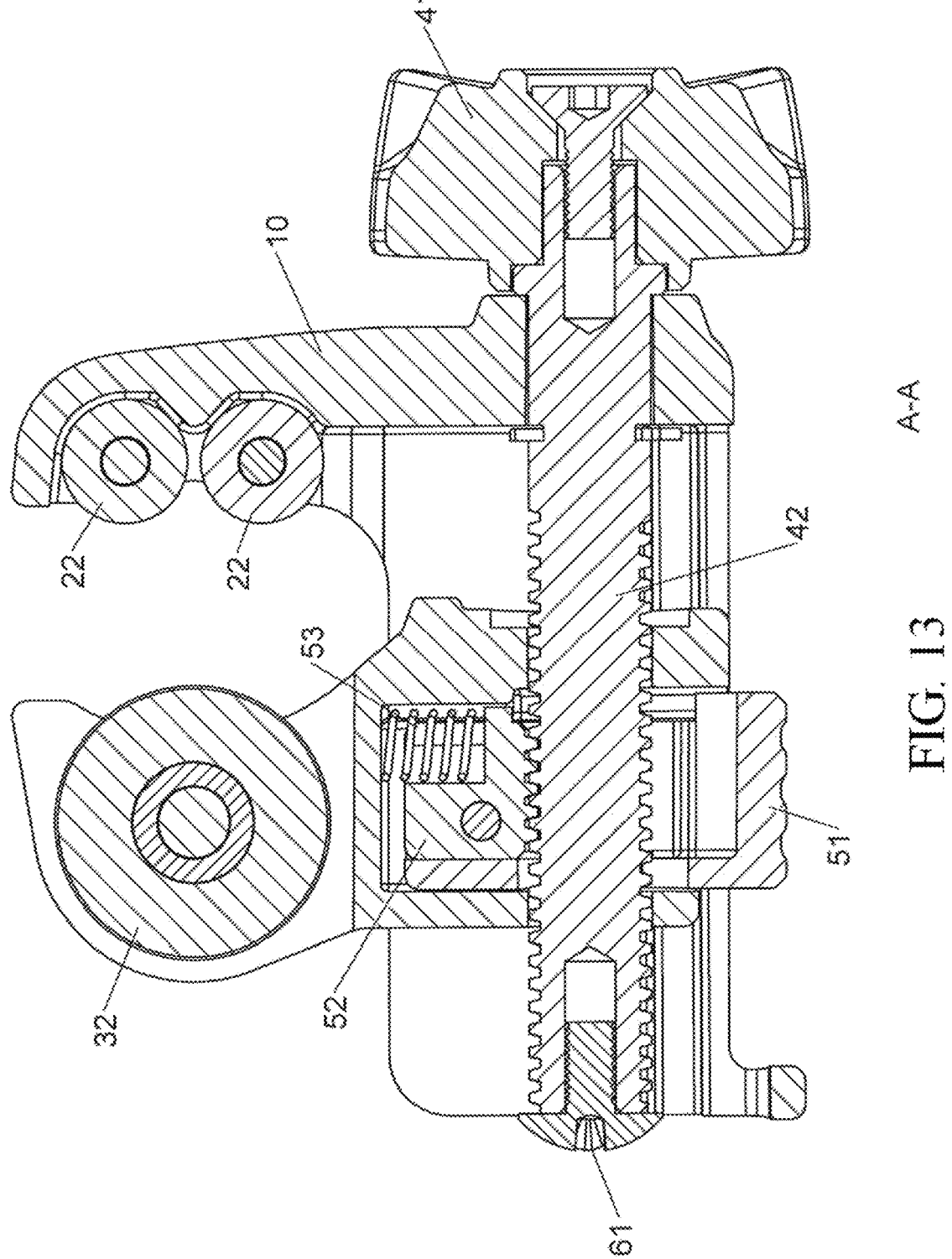
FIG. 13 is a third operational view of the pipe cutting device as shown in FIG. 10.

Referring to FIGS. 11-13 with reference to FIGS. 1-10, when the control unit 50 is pushed by the user, the press member 51 and the control member 52 are moved in the fifth receiving recess 313, and the elastic member 53 is compressed, so that the second screwing portion 521 is moved to disengage the first screwing portion 422. Then, the control unit 50 is pushed by the user successively. Thus, when the control unit 50 is moved by the user, the control unit 50 drives and moves the sliding unit 30, to adjust the distance between the cutting wheel 32 and the two roller units 20 according to the user's requirement. When the control unit 50 is released, the control member 52 is pushed and moved by the elastic force of the elastic member 53, so that the second screwing portion 521 is moved to engage the first screwing portion 422 again. Thus, the control unit 50 is positioned in place.

Figure 14:
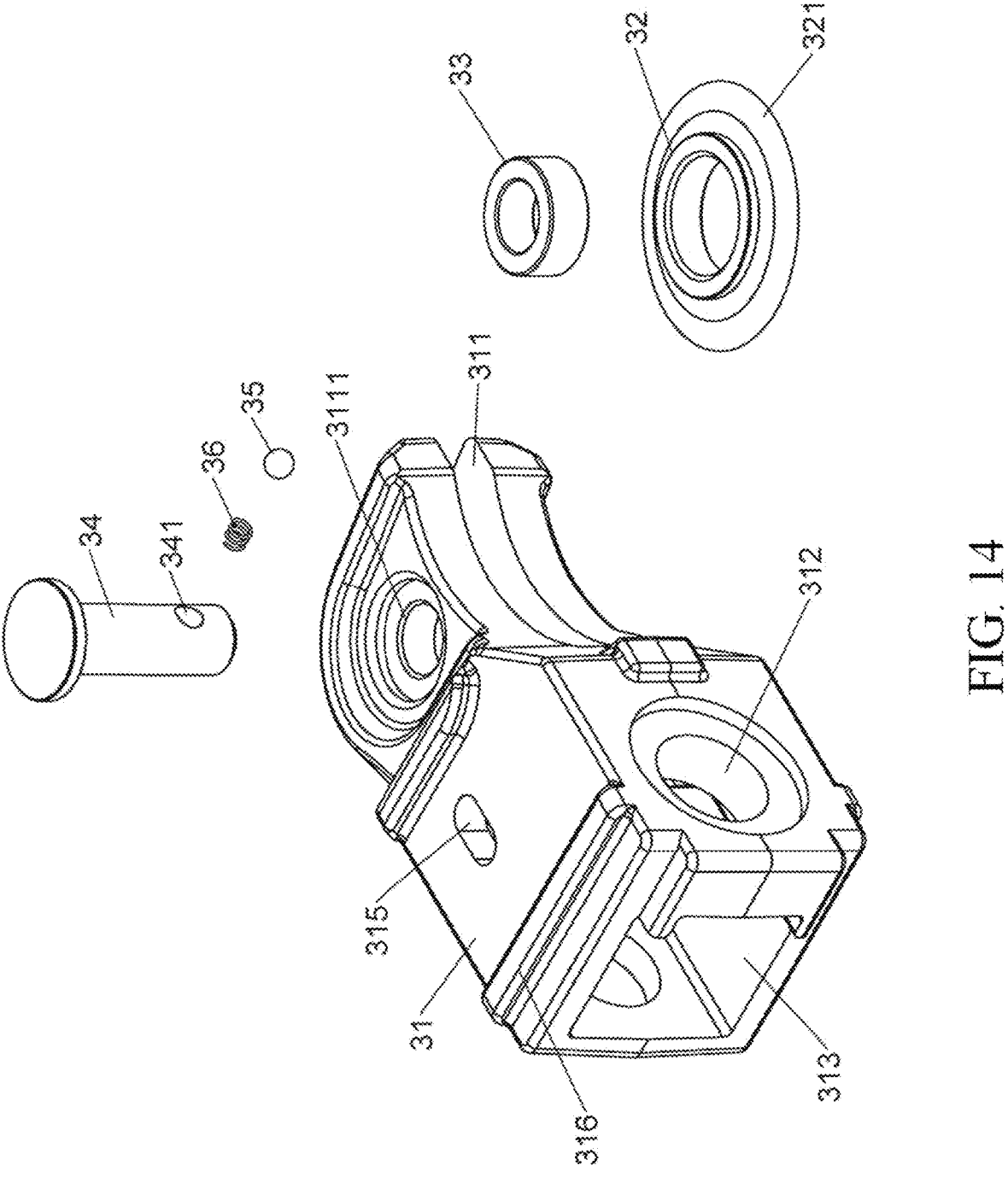
FIG. 14 is an exploded perspective view of a sliding unit of the pipe cutting device in accordance with another preferred embodiment of the present invention.

Referring to FIG. 14, the second connecting portion 341 is a circular cavity not penetrating the post 34. The first connecting member 35 is a ball. The sliding unit 30 further includes an elastomer (or elastic element or spring) 36. The first connecting member 35 and the elastomer 36 are received in the second connecting portion 341. The first connecting member 35 is biased between the elastomer 36 and the slide 31, so that the cutting wheel 32 is rotatably mounted on the slide 31. Thus, when the knife portion 321 of the cutting wheel 32 is blunt or worn out during a long-term utilization, the cutting wheel 32 is replaced easily.

In another preferred embodiment of the present invention, the press member 51 and the control member 52 are formed integrally. In assembly, the press member 51, the control member 52, and the elastic member 53 are initially placed into the fifth receiving recess 313, and the threaded rod unit 40 is then mounted on the main body 10 and the sliding unit 30. Thus, the threaded rod unit 40 restricts the control unit 50 to prevent the control unit 50 from being detached from the fifth receiving recess 313 and the first hollow slot 16. Alternatively, the third connecting member 54 and the elongate slot 315 are undefined.

Accordingly, the pipe cutting device of the present invention has the following advantages.

1. The sliding unit 30 is moved in the first receiving recess 11, the threaded rod unit 40 is pivotally connected with the main body 10 and the sliding unit 30, and the control unit 50 is received in the sliding unit 30, so that the main body 10, the sliding unit 30, the threaded rod unit 40, and the control unit 50 are assembled exactly.

2. The control unit 50 is moved linearly so that the second screwing portion 521 engages or disengages the first screwing portion 422. The position of the fifth receiving recess 313 may have a larger tolerance. After the control unit 50 is received in the fifth receiving recess 313, the user only needs to rotate the threaded rod unit 40 slightly to engage the second screwing portion 521 with the first screwing portion 422. Thus, the second screwing portion 521 engages the first screwing portion 422 exactly by a linear displacement of the control unit 50.

3. The control unit 50 is moved linearly so that the second screwing portion 521 engages or disengages the first screwing portion 422. When the pipe cutting device has a larger specification, the width of the fifth receiving recess 313 is increased, so that the control member 52 may have a larger width, and the second screwing portion 521 has more teeth for engaging the first screwing portion 422. Thus, the second screwing portion 521 engages the first screwing portion 422 exactly by changing the width of the fifth receiving recess 313 and the width of the control member 52.

4. The control unit 50 and the cutting wheel 32 are arranged on two opposite sides of the main body 10. Thus, when the user presses the control unit 50, the user's hand will not touch the cutting wheel 32, so that the control unit 50 is pressed safely.

5. After the cutting wheel 32 is subjected to a force, the force applied on the cutting wheel 32 is directly transmitted to and supported by the sliding unit 30. At this time, the sliding unit 30 with a larger area is assembled with the main body 10 and the threaded rod unit 40, to support a larger force or torque.

6. The main body 10 is assembled with the sliding unit 30, the sliding unit 30 is assembled with the threaded rod unit 40, and the threaded rod unit 40 is assembled with the main body 10, so that the main body 10, the sliding unit 30, and the threaded rod unit 40 are interconnected, to enhance the structural stability of the pipe cutting device, and to facilitate assembly of the pipe cutting device.

7. The threaded rod unit 40 restricts the control unit 50, and the control unit 50 is further limited by the elongate slot 315. Thus, the control unit 50 is limited by the threaded rod unit 40 and the sliding unit 30, so that the control unit 50 has a double restriction function without detachment. In such a manner, the sliding unit 30, the threaded rod unit 40, and the control unit 50 are interconnected and assembled exactly.

8. The threaded rod unit 40 is rotated to drive the control unit 50 which drives and moves the sliding unit 30, to adjust the distance between the cutting wheel 32 and the two roller units 20. Alternatively, when the control unit 50 is pressed, the second screwing portion 521 disengages the first screwing portion 422. Then, the control unit 50 is pushed by the user successively. When the control unit 50 is moved by the user, the control unit 50 drives and moves the sliding unit 30, to adjust the distance between the cutting wheel 32 and the two roller units 20. Thus, the pipe cutting device has two different control mechanisms to adjust the distance between the cutting wheel 32 and the two roller units 20 according to the user's requirement.

9. The first screwing portion 422 is pivotally mounted in the fourth receiving recess 312 which limits a deflection of the fourth receiving recess 312. The threaded rod 42 generally has a determined length. The third pivot portion 421 is pivotally mounted on the first pivot portion 13, and the first screwing portion 422 is pivotally mounted in the fourth receiving recess 312, so that the threaded rod 42 has a better pivotal structure.

10. The sliding unit 30 and the control unit 50 are assembled easily and conveniently. Thus, the sliding unit 30 and the control unit 50 are assembled previously and then placed into the main body 10.

11. The sliding unit 30 is limited by the threaded rod unit 40 and will not be detached from the first receiving recess 11. The two second slide guides 316 are slidably mounted on the two first slide guides 12, to prevent the sliding unit 30 from being detached from the first receiving recess 11.

The invention claimed is:

1. A pipe cutting device comprising:
a main body, two roller units, a sliding unit, a threaded rod unit, and a control unit;
wherein:
the main body is an L-shaped shell;
the main body has an interior provided with a first receiving recess;
the main body is provided with two first slide guides connected to the first receiving recess;
each of the two first slide guides is an elongate channel and extends in a longitudinal direction of the first receiving recess;

the two first slide guides are arranged symmetrically relative to the first receiving recess;

the main body is provided with a first pivot portion connected to the first receiving recess;

the first pivot portion is located beside the first receiving recess;

the main body is provided with a second receiving recess;

the second receiving recess and the first pivot portion are formed on an end of the main body;

the second receiving recess and the first receiving recess are connected and form an L-shaped profile;

the main body is provided with two first connecting portions connected to the second receiving recess;

the main body is provided with a first hollow slot connected to the first receiving recess;

the first hollow slot is located beside the first receiving recess;

the first hollow slot extends in the longitudinal direction of the first receiving recess;

the two roller units are pivotally mounted in the second receiving recess;

each of the two roller units includes a shaft and a roller;

each shaft is pivotally mounted on one of the two first connecting portions;

each shaft is a circular rod;

each roller is pivotally mounted on a respective one of the shafts and received in the second receiving recess;

the sliding unit is mounted in the first receiving recess and is movable in the first receiving recess;

the sliding unit includes a slide, a cutting wheel, and a post;

the slide is partially received in the first receiving recess and is movable linearly in the first receiving recess;

the slide has a first end provided with a third receiving recess directed toward the second receiving recess;

the third receiving recess is provided with a second pivot portion;

the slide is provided with a fourth receiving recess aligning with the first pivot portion and penetrating the slide;

the slide has a second end provided with a fifth receiving recess connected to the fourth receiving recess and aligning with the first hollow slot;

the slide is provided with an elongate slot connected to the fifth receiving recess;

the slide is provided with two second slide guides formed on a top and a bottom of the slide;

the two second slide guides are slidably mounted on the two first slide guides so that the sliding unit slides on the main body linearly;

the cutting wheel is rotatably mounted in the third receiving recess;

the cutting wheel is a circular cutter and has a periphery provided with a knife portion for cutting a pipe;

the cutting wheel aligns with the two roller units;

the post extends through the second pivot portion and is pivotally connected with the cutting wheel, so that the cutting wheel is rotatably mounted in the third receiving recess;

the threaded rod unit is pivotally connected with the main body and the sliding unit;

the threaded rod unit includes a rotation member, a threaded rod, and a second connecting member;

the rotation member is rotatably mounted outside of the main body;

the rotation member is provided with a first mounting portion;

the rotation member and the two roller units are disposed on the same end of the main body;

the threaded rod is provided with a third pivot portion pivotally mounted on the first pivot portion;

the threaded rod has a first end provided with a first screwing portion received in the first receiving recess;

the first screwing portion extends through the fourth receiving recess;

the first screwing portion is loosely fitted in the fourth receiving recess;

the threaded rod has a second end provided with a second mounting portion mounted on the first mounting portion;

when the rotation member is rotated, the rotation member drives and rotates the threaded rod simultaneously;

the second mounting portion has an interior provided with a third connecting portion;

the threaded rod has an end portion provided with a fourth connecting portion;

the fourth connecting portion and the first screwing portion are formed on the first end of the threaded rod;

the fourth connecting portion is a screw hole;

the threaded rod is provided with a fifth connecting portion located between the third pivot portion and the first screwing portion;

the fifth connecting portion is an annular groove;

the second connecting member is a threaded rod;

the second connecting member extends into the rotation member and is screwed into the third connecting portion, so that the rotation member and the threaded rod are rotated simultaneously;

the control unit is assembled with the sliding unit and the threaded rod unit;

the control unit is received and movable in the fifth receiving recess;

the control unit partially protrudes from the fifth receiving recess and the first hollow slot;

the control unit drives the sliding unit to move linearly in the first receiving recess;

when the threaded rod unit is rotated, the control unit and the sliding unit are driven to move linearly;

the sliding unit is moved in the main body, and the control unit is moved on the sliding unit;

the control unit is moved in a direction perpendicular to that of the sliding unit;

the control unit includes a press member, a control member, an elastic member, and a third connecting member;

the press member is received in the fifth receiving recess and partially protrudes from the fifth receiving recess and the first hollow slot;

the press member is provided with a sixth receiving recess allowing passage of the threaded rod;

the press member has an end provided with a seventh receiving recess which is an open cavity;

the press member is provided with two third slide guides located between the sixth receiving recess and the seventh receiving recess;

the two third slide guides are opposite to each other;

each of the two third slide guides is a groove;

the press member is provided with a sixth connecting portion penetrating the seventh receiving recess;

the press member is provided with an eighth receiving recess located beside the sixth receiving recess;

the press member is a non-circular piece;

the control member is assembled with the press member and received in the seventh receiving recess;

the control member has a first end provided with a second screwing portion engaging the first screwing portion;

the control member is provided with two fourth slide guides formed on a top and a bottom of the control member;

the two fourth slide guides are received in the two third slide guides respectively;

each of the two fourth slide guides is a protruding rail;

the control member is provided with a seventh connecting portion aligning with the sixth connecting portion;

the seventh connecting portion is a perforation;

the control member has a second end provided with a spring cavity which is disconnected from the second screwing portion;

the control member has a non-circular shape;

the elastic member is received in the spring cavity;

the elastic member has a first end pressing the spring cavity of the control member and a second end pressing a bottom of the fifth receiving recess;

the second screwing portion is pressed by an elastic force of the elastic member and engages the first screwing portion;

the third connecting member extends through the sixth connecting portion and the seventh connecting portion and has an end extending into the elongate slot;

the third connecting member is movable in the elongate slot, so that the control unit is movable on the sliding unit through a distance;

the threaded rod unit restricts the control member which restricts the press member, so that the control unit is assembled on the sliding unit without detachment;

the third connecting member is assembled with the press member and the control member and is limited by the elongate slot, so that the control unit is assembled on the sliding unit without detachment;

the control unit is limited by the threaded rod unit and the sliding unit, so that the control unit has a double restriction structure without detachment;

when the control unit is pushed, the press member and the control member are moved in the fifth receiving recess, the elastic member is compressed, and the second screwing portion disengages the first screwing portion;

when the control unit is moved, the control unit drives and moves the sliding unit, to adjust a distance between the cutting wheel and the two roller units;

when the control unit is released, the control member is moved by the elastic force of the elastic member, and the second screwing portion engages the first screwing portion;

the pipe cutting device further comprises a fourth connecting member assembled with the fifth connecting portion;

the fourth connecting member is a C-shaped snap ring;

the fourth connecting member rests on a wall of the main body;

the third pivot portion is limited by the fourth connecting member, so that the threaded rod is pivotally mounted in the main body and the sliding unit; and the rotation member is limited by the threaded rod, so that the rotation member is rotatably mounted outside of the main body, and the threaded rod unit is pivotally mounted on the main body and the sliding unit.

2. The pipe cutting device as claimed in claim 1, wherein the main body has an integrally formed structure and is made of metal or plastic material, each of the two first connecting portions is a perforation, and the first hollow slot has an elongate shape.

3. The pipe cutting device as claimed in claim 1, wherein the second pivot portion is a circular perforation and is connected to the third receiving recess, and each of the two second slide guides is an elongate projection.

4. The pipe cutting device as claimed in claim 1, wherein:
the sliding unit further includes a bearing mounted in an axis of the cutting wheel;
the post extends through the second pivot portion and is pivotally connected with the cutting wheel and the bearing;
the post is an elongate rod having a T-shaped cross-sectional profile;
the post is provided with a second connecting portion;
the second connecting portion is an annular groove;
the sliding unit further includes a first connecting member snapped onto the second connecting portion, so that the post is pivotally mounted on the second pivot portion;
the first connecting member is a C-shaped snap ring; and
when the first connecting member is detached from the second connecting portion, the post, the bearing, and the cutting wheel are removed from the slide.

5. The pipe cutting device as claimed in claim 1, wherein the first mounting portion is a non-circular recess, the second mounting portion has a shape matching that of the first mounting portion, and the third connecting portion is a screw hole.

6. The pipe cutting device as claimed in claim 1, further comprising:
a fifth connecting member assembled with the fourth connecting portion;
wherein:
the sliding unit is moved to touch the fifth connecting member which restricts the sliding unit to prevent the sliding unit from being detached from the threaded rod during displacement.

7. The pipe cutting device as claimed in claim 1, wherein:
the second connecting portion is a circular cavity not penetrating the post;
the first connecting member is a ball;
the sliding unit further includes an elastomer;
the first connecting member and the elastomer are received in the second connecting portion; and
the first connecting member is biased between the elastomer and the slide, so that the cutting wheel is rotatably mounted on the slide.

8. The pipe cutting device as claimed in claim 1, wherein:
the press member and the control member are formed integrally;
the press member, the control member, and the elastic member are initially placed into the fifth receiving recess, and the threaded rod unit is then mounted on the main body and the sliding unit; and
the threaded rod unit restricts the control unit to prevent the control unit from being detached from the fifth receiving recess and the first hollow slot.

* * * * *